Figure 1:
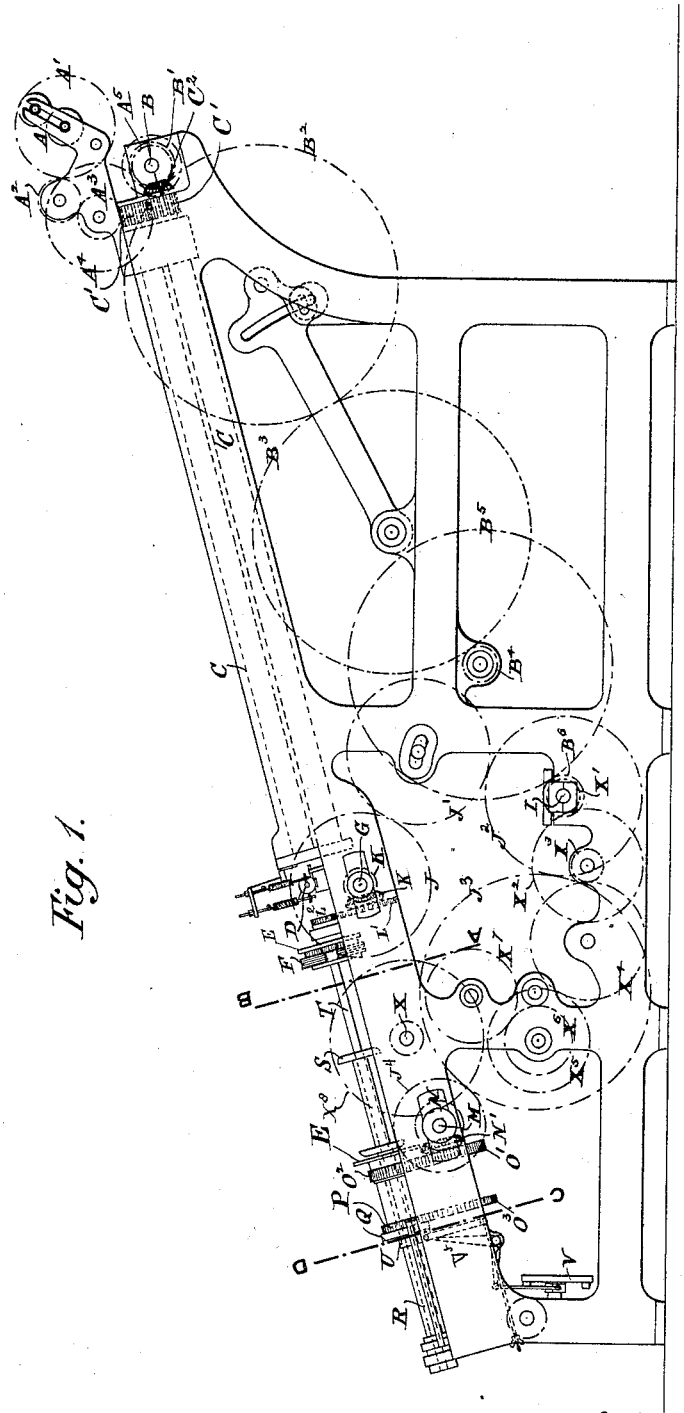

(No Model.) 6 Sheets—Sheet 1.

A. T. LAWSON.
MACHINE FOR SPINNING FLAX, &c.

No. 390,486. Patented Oct. 2, 1888.

Witnesses
Baltus De Jong.
Lloyd B. Wight.

Inventor
Arthur Fredgold Lawson
By his Attorneys.
Baldwin, Hopkins & Peyton (No Model.) 6 Sheets—Sheet 2.

A. T. LAWSON.
MACHINE FOR SPINNING FLAX, &c.

No. 390,486. Patented Oct. 2, 1888.

Witnesses
Baltus DeLoy
Lloyd B. Wright

Inventor
Arthur Tredgold Lawson
By his Attorneys
Baldwin Hopkins & Peyton

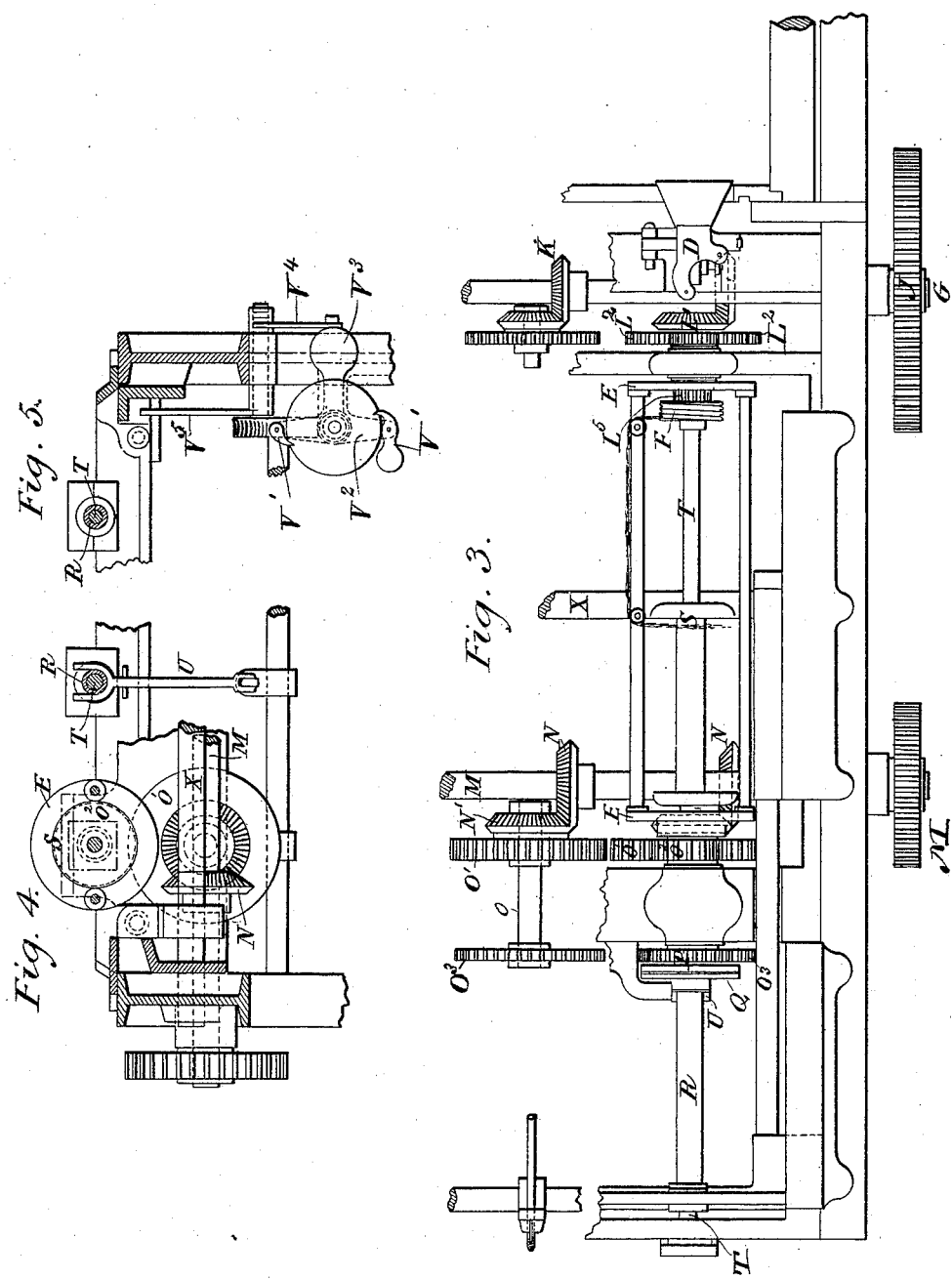

(No Model.) 6 Sheets—Sheet 4.
A. T. LAWSON.
MACHINE FOR SPINNING FLAX, &c.
No. 390,486. Patented Oct. 2, 1888.
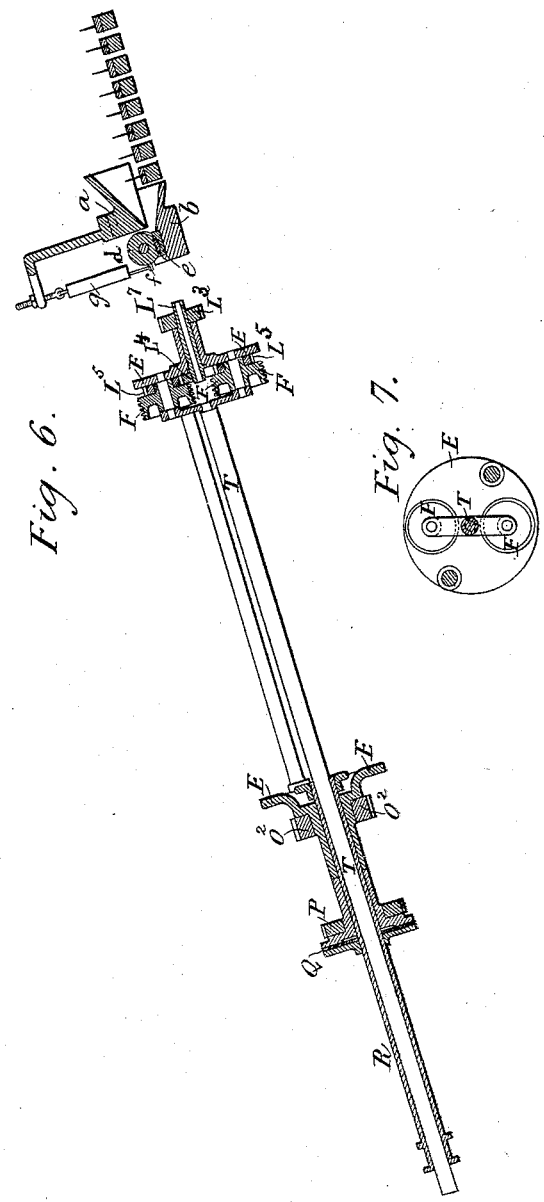

(No Model.) 6 Sheets—Sheet 5.

A. T. LAWSON.
MACHINE FOR SPINNING FLAX, &c.

No. 390,486. Patented Oct. 2, 1888.

(No Model.)  6 Sheets—Sheet 6.
A. T. LAWSON.
MACHINE FOR SPINNING FLAX, &c.
No. 390,486.  Patented Oct. 2, 1888.
Fig. 11.
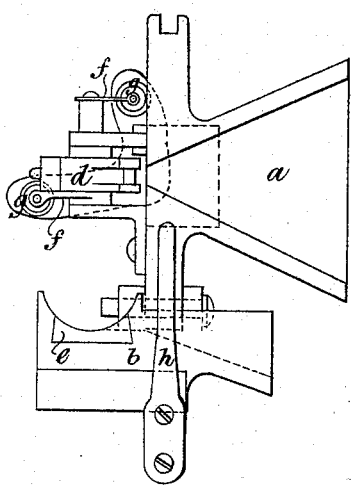
Fig. 12.
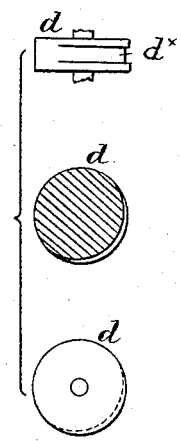
Fig. 10.
Fig. 13.
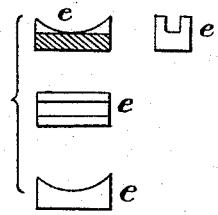
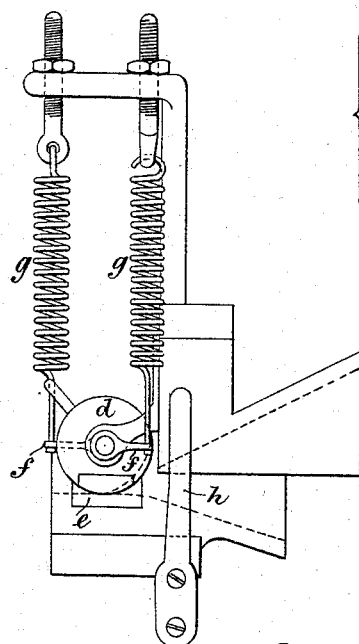
Witnesses
Baltus DeLong
Lloyd B. Wight
Inventor
Arthur Tredgold Lawson
By his Attorneys
Baldwin Hopkins & Payton

UNITED STATES PATENT OFFICE.

ARTHUR TREDGOLD LAWSON, OF LEEDS, COUNTY OF YORK, ENGLAND.

MACHINE FOR SPINNING FLAX, &c.

SPECIFICATION forming part of Letters Patent No. 390,486, dated October 2, 1888.

Application filed December 13, 1887. Serial No. 257,777. (No model.) Patented in England December 20, 1886, No. 16,726, and in France November 17, 1887, No. 187,056.

*To all whom it may concern:*

Be it known that I, ARTHUR TREDGOLD LAWSON, engineer, a subject of the Queen of Great Britain, residing at Hope Foundry, Leeds, in the county of York, England, have invented certain new and useful Improvements in Machines for Spinning Flax, Hemp, and other Fibers, (for which I have received Letters Patent in Great Britain, No. 16,726, of December 20, 1886, and in France, No. 187,056, of November 17, 1887,) of which the following is a specification.

This invention has for its object improvements in machinery for spinning yarns from flax, hemp, and other fibers.

The apparatus in which my invention is embodied consists of a sheet of gills in the teeth of which the yarn is carried forward to a nipping apparatus, and from which the yarn passes to a spindle and flier and is spun and wound upon a bobbin. The sheet of gills runs in a direct line with the part carrying the flier, so that the sliver passes forward direct to the nipper. The sheet of gills and the flier are inclined at a convenient angle to facilitate the operation of piercing and doffing the yarn. The nipper is in two parts, and is formed in connection with a trumpet-mouth, which also is divided. The parts are connected together by a hinged joint, so that the upper part may be lifted away from the lower whenever it may become necessary to clear the yarn passing through the nipper. The lower part or bed is fixed, and it is grooved on the face to receive the sliver. The upper part carries a roller, which also is grooved. The grooves in the two parts meet in an eye through which the sliver passes. On the axis of the roller there are two arms extending in opposite directions, and to these arms springs are attached, so that the roller is held in position, and its rotation is resisted by the springs operating the one against the other. The groove in the roller is deepest at the point where the sliver first reaches it, and it tapers up to and beyond the eye. When the springs are in equilibrium, the eye is contracted and the sliver is compressed, so that as the yarn passes forward friction occurs between the sliver and the roller. This friction disturbs the equilibrium of the springs, and the roller turns through a small angle thereby, in a well known manner, maintaining a constant light nip upon the sliver up to which the twist put on by the flier runs, the eye opening or closing until the friction upon the roller and the tension of the springs are in equilibrium. It will be observed that when the upper part of the nipper is lifted the trumpet mouth is opened and the roller with its springs are all lifted together away from the bed. This is an important feature. From the nipper the yarn passes on into the end of a hollow spindle. This spindle has upon its upper end a spur-pinion geared into another pinion and on which is fixed a bevel-wheel driven by another bevel which is keyed on a shaft placed at right angles. This shaft, which is driven by a train of wheels from the pulley-shaft, takes the change-wheels for varying the twist in the yarn. At the end of the tube which runs in the upper flier-plate is fixed a spur-pinion which is geared into other pinions on the sheave-pulleys. Around these pulleys the yarn is lapped, and so is drawn forward at a suitable speed. It passes then to the flier-arm, and so on to the bobbin. On the flier-plate is placed a spur-pinion, made to gear into another pinion, attached to which is a bevel-wheel driven by another bevel on a shaft placed at right angles to the flier-plate, which shaft is driven directly from the pulley-shaft. The spur-pinion which gears into the one on the flier-plate is fixed at one end of a shaft running underneath and parallel to the flier, having at the other end a pinion driving the friction-plate for dragging the bobbin.

The drawings annexed show machinery constructed as above described.

Figure 2:
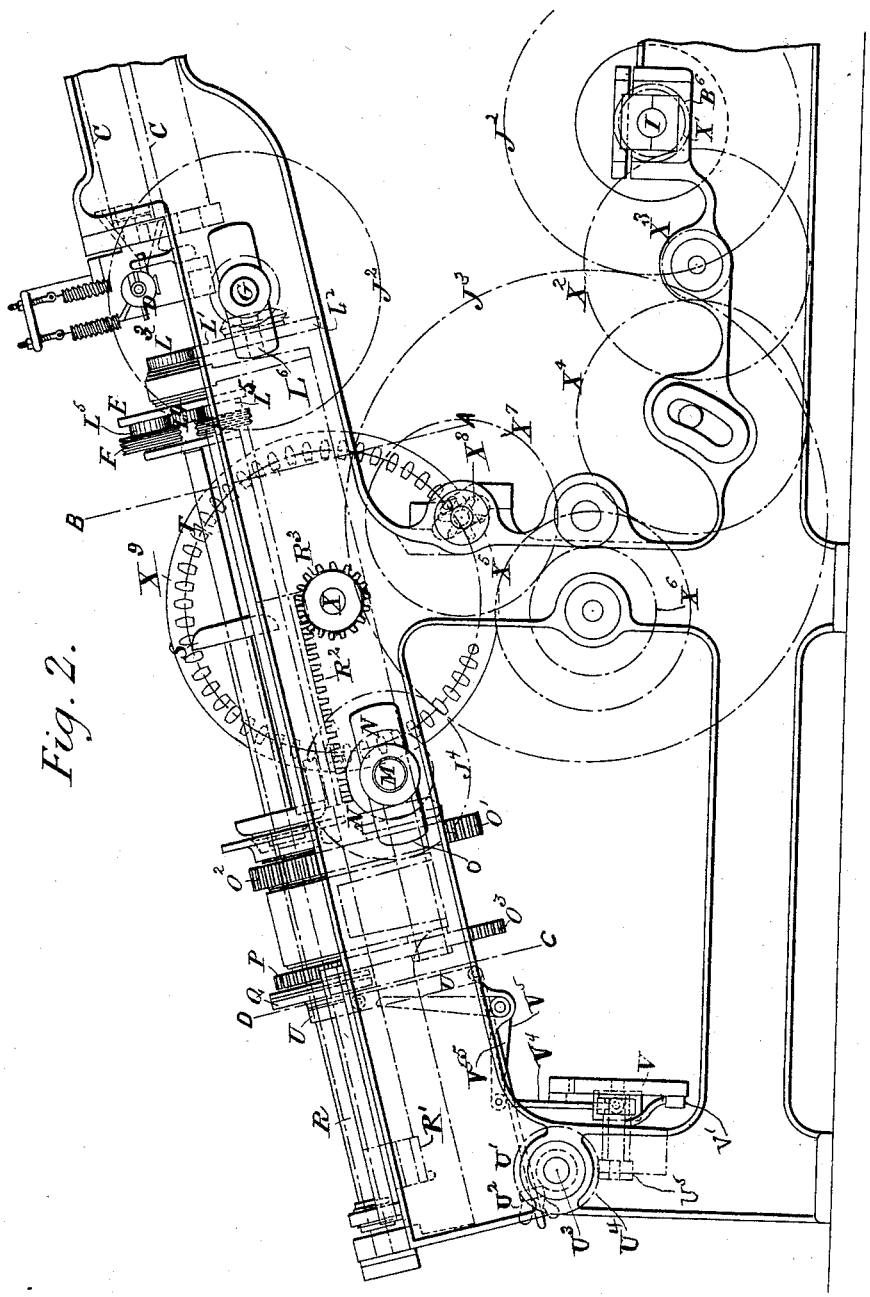
Figure 9:
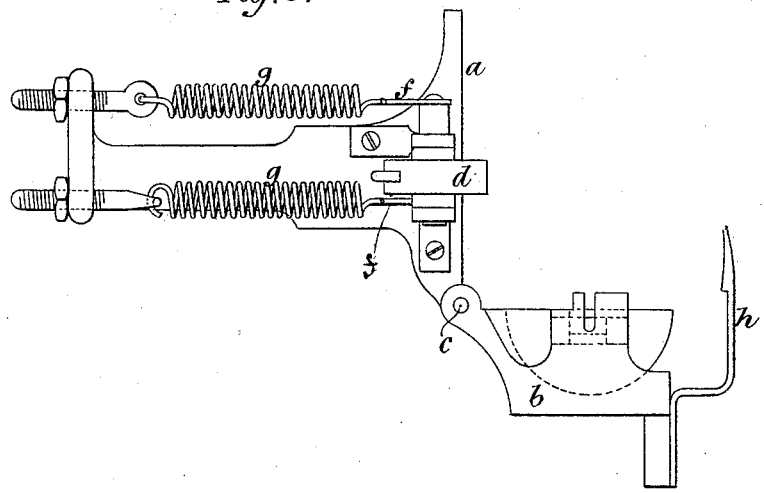
Figure 8:
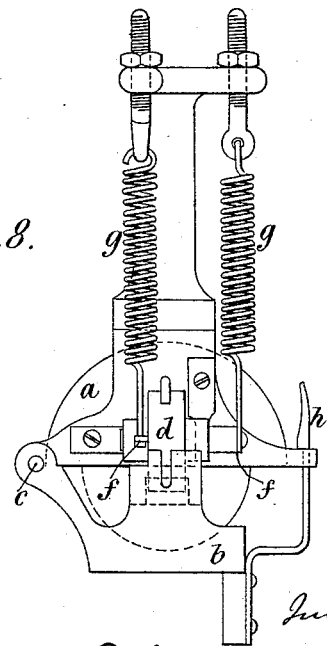

Figure 1 is a side elevation of the machine. Fig. 2 is a side elevation of the left-hand portion, to a larger scale. Fig. 3 is a plan of flier and gearing. Fig. 4 is a section through the line A B, Fig. 2. Fig. 5 is a section through the line C D of Fig. 2. Fig. 6 is a longitudinal section of the flier, nipping mechanism, and gill-combs. Fig. 7 is a cross-section of the flier. Fig. 8 is a front elevation of the nipping mechanism when closed; Fig. 9, a front elevation of same when open; Fig. 10, a side elevation of same when closed; Fig. 11, a side elevation when open. Fig. 12 shows views of the nipper-roller, and Fig. 13 shows views of the nip-bed.

A are the back feed-rollers, which feed sliver to a screw-gill, C, by which it is conveyed to a nipping mechanism, D, from which it passes through a hollow spindle to the flier E.

It will be seen that the flier, spindle, and screw-gill are all in a line with each other and at an angle inclined to the horizontal, so that all the parts can be readily seen and got at. The machine is also so disposed that all the parts have motion transmitted to them by toothed gearing from a series of shafts which run from end to end of the machine at right angles to the fliers, so that the machine may be of any desired length, with any desired number of fliers arranged side by side, and all receive their motion from the same shafts, as I will now describe.

The feed-rolls A and the screws of the screw-gill mechanism have motion given to them from the back shaft, B. This shaft is driven from the driving-shaft through toothed wheels $B'$ $B^2$ $B^3$ $B^4$ $B^5$ $B^6$. The lower roll of each pair of rolls A is driven from a pinion, $A^5$, fixed on the shaft B, through toothed wheels $A'$ $A^2$ $A^3$ $A^4$. The two screws of each pair of screws of the screw-gill mechanisms are geared together by pinions $C'$, and one of them is driven by a bevel-pinion, $C^2$, upon it, gearing into a corresponding pinion on the shaft B.

The sheave-pulleys F, which are carried by the end plate of the flier E, and which draw the yarn forward through the nipping mechanism D, are driven from a shaft, G, which, by toothed wheels J $J'$ $J^2$, is driven from the main shaft I. Each sheave-pulley has fast upon it a pinion, $L^5$, which gears with the pinion $L^4$ on a hollow axis, $L^7$, on which is a toothed pinion, $L^3$. This gears with a toothed wheel, $L^2$, on a short axis, $L^6$, which also carries a bevel-wheel, $L'$, that gears with a corresponding wheel on the shaft G. (See Figs. 2 and 6.)

The flier E and the bobbin-holder are driven from the shaft M, which is driven from the main shaft I through the spur-wheels $J^3$ $J^4$.

The hollow axis of the flier E has fast upon it a spur-wheel, $O^2$, which gears with a spur-wheel, $O'$, on a short shaft, O, which is parallel with the axis of the flier. The short shaft O is driven by a bevel-pinion, $N'$, upon it, gearing into a corresponding pinion, N, on the shaft M.

To drive the bobbin-holder, the short shaft O has also upon it a spur-wheel, $O^3$, which gears with a spur-wheel, P, through which the hollow spindle R of the bobbin-holder passes loosely. The hollow spindle R can also move endwise through a disk, Q, but cannot turn in it. The disk Q is pressed toward the spur-wheel P by a lever, U, and is thereby revolved. As usual, the pressure is increased as yarn accumulates on the bobbin.

This increase of pressure may be obtained in any suitable manner. In the drawings it is shown as obtained by the lever U being coupled by an elastic connection, $U'$, to an arm $U^2$, on an axis, $U^3$, which runs from end to end of the machine. (See Fig. 2.)

As yarn accumulates on the bobbins, this axis is slowly turned and the tension on the elastic connections $U'$ thereby increased. The slow turning of this axis is caused by a worm-wheel, $U^4$, upon it being driven by a worm, $U^5$. The worm has a ratchet-wheel, V, fixed on its axis, and a step-by-step revolving motion is given to the ratchet-wheel by pawls, $V'$, carried by arms, $V^2$, (see Fig. 5,) which can oscillate on the axis. A third weighted arm, $V^3$, is coupled by a link, $V^4$, with one arm of a bell-crank lever, $V^5$, the other arm of which is struck by the traverse-bar $R'$ each time that it completes a backward traverse, and the pawls are thereby caused to turn the ratchet-wheel a distance. When the traverse-bar $R'$ makes its return movement, the weighted arm $V^3$ brings the pawls back to their normal position.

The spindles R of the bobbin-holders are connected to the traverse-bar $R'$ in such a way that they can turn freely, but are traversed to and fro with it.

The traverse-bar $R'$ is traversed to and fro by toothed racks $R^2$ upon it gearing with spur-wheels $R^3$, fixed upon the shaft X. This shaft has upon it a "mangle wheel," $X^9$, with a segment of external and internal spur-teeth. This segment is driven first in one direction and then in the opposite direction by a pinion, $X^8$, gearing first with the external teeth and driving the segment in one direction, and then rolling around the end of the segment and gearing with the internal teeth and driving in the opposite direction.

The pinion $X^8$ is driven from the main shaft I through the spur-wheels $X^7$ $X^6$ $X^5$ $X^4$ $X^3$ $X^2$ $X'$.

S is a bobbin, and T a fixed spindle passing through the axes of the bobbin-holder and flier.

The construction of the nipper is clearly shown in Figs. 6 to 11. Its position relatively to the screw-gills and flier is shown in Fig 6. Figs. 12 and 13 show separate views of the nipper-roller and the nip-bed.

In the figures $a$ is the upper part of the trumpet-mouth, the lower part of which is carried by a block, $b$, which is fixed to the frame of the machine.

$c$ is the hinge by which the upper part, $a$, is hinged to the lower part, $b$.

$d$ is the grooved roller, (see Fig. 12,) carried in bearings in arms extending from the upper half, $a$, of the trumpet-mouth. The form of the groove is best seen in Figs. 10 and 12.

$e$ is the lower part or bed of the nipper carried by the block $b$, just below the grooved roller.

$ff$ are two arms extending in opposite directions from the axis of the roller $d$.

$gg$ are the coiled springs, one connected to one arm, the other to the other arm, and acting in the manner hereinbefore explained.

$h$ is a spring-catch by which the upper part of the nipper, when shut down onto the lower half, is retained.

The action of the grooved roller and bed in putting friction onto the sliver as it passes between them is well known; but heretofore both springs $g$ have been attached to one arm, $f$, extending from the roller, one spring pulling in one direction, the other in the opposite direction; but by forming the roller $d$ with two arms extending from it in opposite directions I am able to carry both springs $g$ by the upper part, $a$, of the trumpet-mouth, so that this part, together with the springs and roller, can be turned back on a hinge-joint, in the manner described.

The grooves in the roller and nip-bed meet in an open eye, through which the sliver passes. On the axis of the roller $d$ there are two arms, $f\,f$, extending in opposite directions, and to these arms springs $g\,g$ are attached, so that the roller is held in position, and its rotation is resisted by the springs operating the one against the other. The groove $d^\times$ in the roller $d$ is deepest at the point where the sliver first reaches it, and it tapers up to and beyond the eye. When the springs are in equilibrium, the eye is contracted and the sliver is compressed, so that as the yarn passes forward friction occurs between the sliver and the roller. This friction disturbs the equilibrium of the springs, and the roller turns through a small angle, thereby, in a well-known manner, maintaining a constant light nip upon the sliver, up to which the twist put on by the flier runs, the eye opening or closing until the friction upon the roller and the tension of the springs are in equilibrium.

It will be observed that when the upper part of the nipper is lifted the trumpet-mouth is opened, and the roller, with its springs, are all lifted together away from the bed.

Having now particularly described and ascertained the nature of the said invention and in what manner the same is to be performed, I declare that what I claim is—

The combination of parts forming the condensing and nipping mechanism, consisting of the trumpet-mouth in two parts, the lower part fixed and the upper one hinged to it, the bed-piece of nipping mechanism fixed to the bottom part, the roller resting thereon and carried by the upper part, the two arms extending in opposite directions from the roller, and the springs attached to these arms and to a standard rising up from the upper part, whereby the roller, the springs, and the upper half of the trumpet-mouth may all be turned back upon the hinge-joint.

ARTHUR TREDGOLD LAWSON.

Witnesses:
 HENRY S. LENTY,
 GEO. F. MOSS,
*Clerks to T. & H. Greenwood Teale, Solicitors and Notaries Public, Leeds, England.*